F. STEIN.
SAFETY DEVICE FOR CINEMATOGRAPH PROJECTING APPARATUS.
APPLICATION FILED AUG. 5, 1921.
1,415,494.
Patented May 9, 1922.
3 SHEETS—SHEET 2.
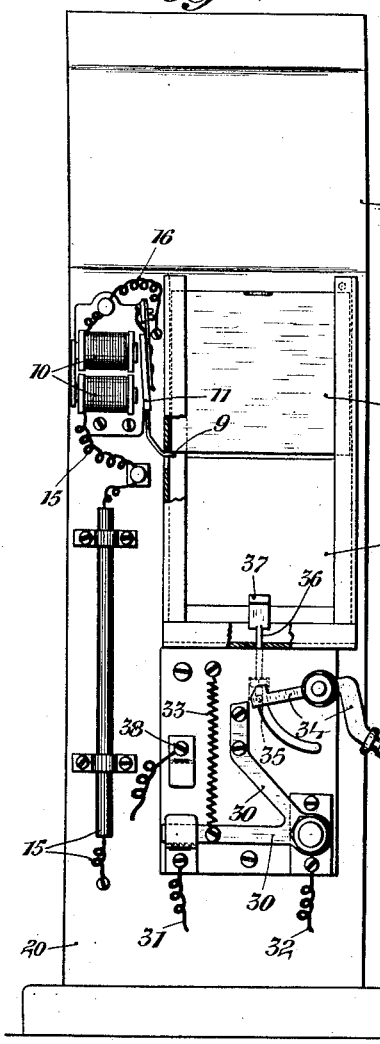
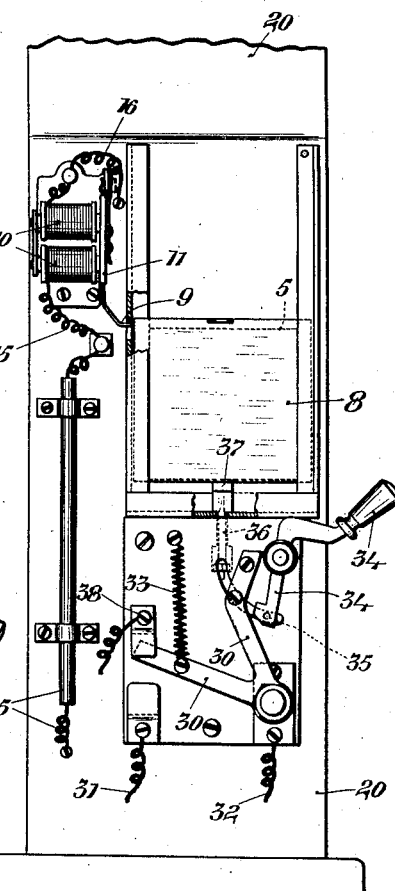
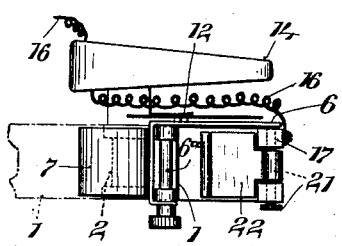

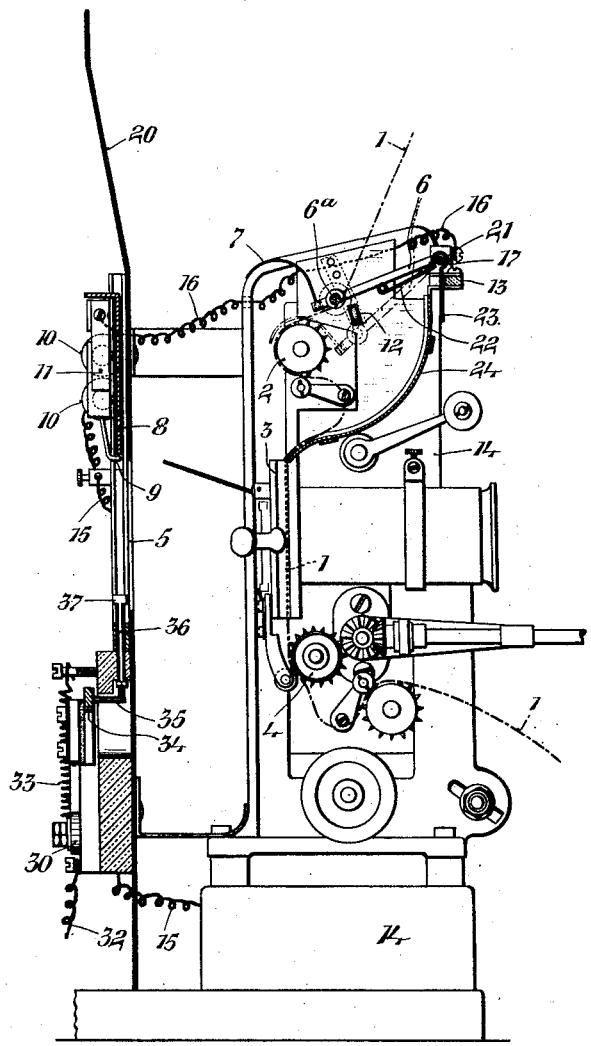

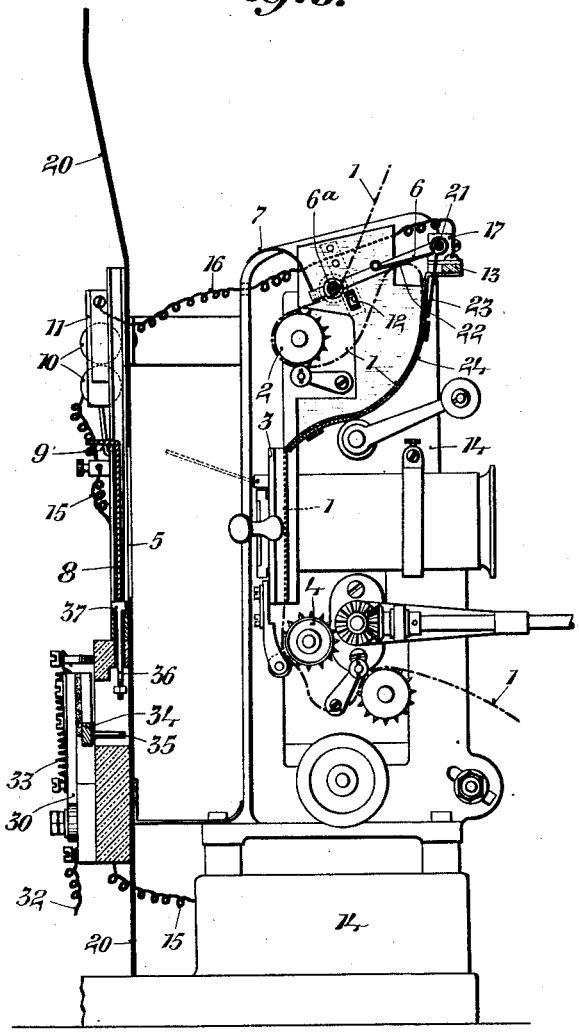

UNITED STATES PATENT OFFICE.

FRIEDRICH STEIN, OF VILLINGEN, GERMANY.

SAFETY DEVICE FOR CINEMATOGRAPH PROJECTING APPARATUS.

1,415,494.      Specification of Letters Patent.      Patented May 9, 1922.

Application filed August 5, 1921. Serial No. 490,126.

(GRANTED UNDER THE PROVISIONS OF THE ACT OF MARCH 3, 1921, 41 STAT. L., 1313.)

*To all whom it may concern:*

Be it known that I, FRIEDRICH STEIN, a citizen of the German Republic, residing at Villingen, Germany, have invented certain new and useful Improvements in Safety Devices for Cinematograph Projecting Apparatus, (for which I have filed applications in Germany, November 28, 1917; Austria, November 17, 1919; Belgium, November 18, 1919; Switzerland, November 19, 1919; Denmark, November 21, 1919; Sweden, November 27, 1919; Great Britain, November 26, 1919; France, December 2, 1919; Hungary, December 6, 1919; Czecho-Slovakia, January 16, 1920, and Poland, March 29, 1920,) of which the following is a specification.

My invention relates to a safety device for cinematograph projecting apparatus, which acts so as to render impossible any ignition of the highly inflammable film by intense radiation. The device becomes operative as soon as the film breaks in front of the feed roller and when the film is no longer pulled, that is to say for instance when it breaks at the edges with which the driving wheel engages, that is to say when the film becomes piled up in the projector apparatus without being pulled forward or when the film is finished. The device acts by automatically closing the window through which the concentrated rays of light fall on the film and when the window is closed, the supply of current to the driving device of the cinematograph apparatus is switched off. In order to light the auditory in such a case, another electric light may be switched on simultaneously with the switching of the motor.

Even if a film were set on fire within the light projecting apparatus, the reflection of the fire would not reach the auditory, as the window through which the rays of light reach the projector apparatus is automatically closed.

The device operates so that on the film breaking or becoming piled up in the film driving device, an electric contact is closed, which releases a slide which drops in front of the window admitting rays of light into the projector apparatus, and thus shuts off the rays of light. The dropping of the said slide operates at the same time a lever, owing to which a spring controlled switch lever for the motor of the apparatus is so released that it takes up another position and thus switches off the current for the purpose of stopping the apparatus. This contact lever is automatically connected by the spring to another contact lever, owing to which illumination, for instance for lighting the room, emergency lighting etc., is switched on. This contact action, for releasing the slide of the window, is brought about either by a flap arranged in front of the feed roller of the film and held raised by the latter and dropping automatically in the event of the film breaking, or if the film breaks behind the feed roller, the said film becoming piled up owing to the continued advance by the said roller raising another flap which also closes a circuit, owing to which the slide of the window is released. This dropping slide releases in that case the contact lever for the driving motor.

A construction according to the invention is illustrated by way of example in the accompanying drawing.

Fig. 1 shows the same in longitudinal section with the parts of the projector lamp, Fig. 2 is a back view looking towards the screen and the window, Fig. 3 shows the arrangement with the window closed, Fig. 4 gives a back view of the parts for that position and Fig. 5 is a plan of the arrangement of the flaps.

The film 1 is wound off the roller in the usual manner, over the feed roller 2 in front of the window 3, and over the drawing off rollers 4 actuated in the usual manner by the cross of Malta motion. The light of the lamp passes through the open window 5 on the strip 1 and is projected thence onto the screen through the lens. The window 5 is provided in a screen 20, in front of the light projecting apparatus. Before the film 1 reaches the feed roller 2, it is carried under the roller 6ª of a flap 6 pivoted at one side, the metal guard or projecting plate 7 of which is suitably insulated from the flap 6 for the purpose of avoiding the closing of a circuit.

The object of the guard plate 7 is to force the flap 6 to carry the film 1 without fail over the feed roller 2. In front of the window 5, a slide 8 is freely adjustable in guides of the screen 20 and is held raised by the armature hook 9 of the armature 11 of an electro-magnet 10.

Below the flap 6 held raised by the film 1, is arranged a spring contact 12. The flap itself is suspended so that it is insulated from the frame 14 of the apparatus by an insulating layer 13. The electromagnet 10 is electrically connected by a conductor 15 to the frame 14. The other conductor 16 is electrically connected to the bearing 17 of the flap 6. The working is therefore as follows:—

If the film 1 breaks off above the feed roller 2, the flap 6 will drop. In dropping, its arm passes the spring contact 12, owing to which the circuit is closed. The current energizes the electro-magnet 10. The latter attracts the armature 11. The armature hook 9 releases the slide 8. The latter drops down and closes the window opening 5, so that the rays of light from the lamp cannot reach the film.

In order to ensure the same result in the event of the film breaking between the feed roller 2 and the drawing rollers 4, which might happen for instance if owing to the breaking of the teeth of the drawing rollers, that is to say the film stops in front of the window, the following arrangement is provided:—

Round the spindle 21 of the bearing 17 is rotatable a flap 22 which normally hangs with its back wall 23 freely downwards, but when raised, the said back wall 23 is brought into engagement with the guide 24 (Fig. 3) and closes a circuit.

If the film 1 is fed by the feed roller 2, but no longer drawn off by the drawing rollers 4, it becomes piled up in the guide 24 and being pulled by the feed roller 2, rises in the space above the guide 24 until it reaches the flap 22 (see Fig. 3) and raises the said flap. This flap 22 then establishes the contact 23, 24, so that a circuit is again closed. The magnet 10 is again energized and the armature 11 attracted, that is to say the slide 8 is released and the window 5 closed by the said slide 8. In order to ensure reliable action, the flap 22, 23 has an insulated suspension.

The following arrangement is used to switch off at the same time the supply of power to the driving motor. The switch 30 is connected by conductors 31, 32 to the motor. It is controlled by a spring 33 which has the tendency to pull the switch into the off-position. This is prevented by the lever 34 which engages with the shoe 30ᵃ of the switch 30. The lever 34 is provided with a pin 35 which is in the plane of the pin 36 of a locking bolt 37 which in its turn is in the plane of the slide 8. When it is proposed to project light, the lever 34 is brought into the position shown in Fig. 2 and therefore the motor is switched in by the switch 30. When however the slide 8 drops down, it falls also on the locking bolt 37. The latter depresses the lever 34 (see Fig. 4) and the spring 33 pulls the switch 30 into the off position. The driving motor is thus switched off, and the window 5 closed by the slide.

In order to provide, on the motor being switched out, an illumination (emergency lighting) for the auditory in the cinematographic apparatus itself, a further terminal 38 could be provided connected to a circuit for such lighting, the switch 30 being pulled by the spring 33 against the said terminal, so that the lighting in question is switched on. For operating the above described mechanism, it is only necessary to install a low power battery.

As will be seen from the foregoing, the film is only required either to break in front of the feed roller or to become piled up between the feed roller and the drawing rollers, in order that a contact should be at once established, so that the electromagnet 10 becomes energized and the window 5 closed by means of the slide 8, and it is sufficient for the window 5 to be closed by its slide 8 in order to switch off the motor, and switch on the emergency lighting.

As the device according to this invention is controlled by immediate contact and as also the window 5 closes immediately the film which is stationary in the apparatus cannot ignite. But even if the film should do so, the above described action takes place immediately as the flap 6 then becomes operative owing to the ignition of the film.

I claim:—

A fire-preventing device for cinematographic apparatuses in which a shutter intercepting the light rays of the projection lamp is released when the film breaks above the first sprocket or when it piles up below the same, comprising in combination with two feed sprockets, a contact lever resting on the film in front of the first of said feed sprockets and coming into operation when the film breaks above this first feed sprocket, a second contact lever which when the feed fails is raised by the loop of the film rising between said two feed sprockets, and a common pivot pin for said two contact levers.

In testimony whereof I affix my signature in presence of two witnesses.

FRIEDRICH STEIN.

Witnesses:
 Lucinko Bastian,
 Karl Schmann.